United States Patent
Ali et al.

(10) Patent No.: US 7,926,096 B2
(45) Date of Patent: Apr. 12, 2011

(54) ENFORCING TIME-BASED TRANSACTION POLICIES ON DEVICES LACKING INDEPENDENT CLOCKS

(75) Inventors: Asad Mahboob Ali, Austin, TX (US); Bertrand du Castel, Austin, TX (US); Apostol Vassilev, Austin, TX (US); Sylvain Prevost, Austin, TX (US); Kapil Sachdeva, Austin, TX (US)

(73) Assignee: Gemalto SA, Meudon (FR)

( * ) Notice: Subject to any disclaimer, the term of this patent is extended or adjusted under 35 U.S.C. 154(b) by 1202 days.

(21) Appl. No.: 11/216,363

(22) Filed: Aug. 31, 2005

(65) Prior Publication Data
US 2007/0058812 A1   Mar. 15, 2007

(51) Int. Cl.
*H04L 29/06* (2006.01)
(52) U.S. Cl. ............. 726/9; 713/178; 713/400; 713/502
(58) Field of Classification Search .................. 380/274; 713/178, 400, 502, 172; 705/65; 726/9
See application file for complete search history.

(56) References Cited

U.S. PATENT DOCUMENTS

| | | | |
|---|---|---|---|
| 5,500,897 A * | 3/1996 | Hartman, Jr. ................. | 713/178 |
| 6,078,956 A * | 6/2000 | Bryant et al. ................. | 709/224 |
| 6,393,126 B1 * | 5/2002 | van der Kaay et al. ........ | 380/241 |
| 6,408,388 B1 * | 6/2002 | Fischer ......................... | 713/176 |
| 6,742,048 B1 * | 5/2004 | Walsh ............................ | 709/248 |
| 6,823,456 B1 * | 11/2004 | Dan et al. ...................... | 713/178 |
| 7,411,868 B2 * | 8/2008 | Kohmoto ........................ | 368/10 |
| 2002/0129290 A1 * | 9/2002 | Couillard ...................... | 713/400 |

FOREIGN PATENT DOCUMENTS

WO   WO 2004075525 A1 *   9/2004

* cited by examiner

*Primary Examiner* — Minh Dinh
*Assistant Examiner* — Virginia Ho
(74) *Attorney, Agent, or Firm* — Pehr B. Jansson; The Jansson Firm (57) ABSTRACT

A system and a method for operating a device that is not capable of independently maintaining a local time clock to enforce a time-based transaction policy that requires a reliable time reference. The device establishes a secure communications channel to one or more network-attached time sources and inquires of each of the network-attached time-sources as to the current time using the secure communications channel. The device receives the current time from the network-attached time-sources and uses the received current times to estimate a current calendar time and to compute a reliability index associated with the estimated current calendar time. The device uses the estimated current calendar time and reliability index to enforce the time-based transaction policy.

18 Claims, 8 Drawing Sheets

ENFORCING TIME-BASED TRANSACTION POLICIES ON DEVICES LACKING INDEPENDENT CLOCKS

TECHNICAL FIELD

The present invention relates generally to enforcing time-based security policies and more particularly to the enforcement of time-based security policies on devices that lack independent clocks.

BACKGROUND OF THE INVENTION

Accurate completion of many computerized transactions requires a measure of time. The quality and reliability of that time is a factor in the reliability and accuracy of the transaction. In fact, certain transactions are so time-dependent that without an accurate measure of time, the transaction is not possible.

For most computers, having an accurate measure of time is not a particularly difficult problem. Most computers have internal clocks that are powered by a battery even if the computer has been turned off. Thus, at any time in the future, if the computer is asked to carry out a transaction that requires that it has an accurate clock—provided that the battery has not failed, that the clock keeps good time, and that the originally provided time can be trusted—the computer may carry out the time-based transaction.

However, if for some reason a clock is not available, e.g., if the computer or computerized device does not have an independent clock, transactions that require that the computer has an accurate and reliable measure of time are not possible. Similarly, if the computer or computerized device is tasked with enforcing a security policy that requires that it knows the current time, it would not be able to do so if it does not have an accurate and reliable measure of time.

One example where accurate and reliable time is required is the processing of digital certificates that have a limited life span. Examples of such certificates are X.509 certificates. An X.509 certificate is a certificate issued by a trusted certificate authority indicating that the entity presenting that certificate as part of a public key infrastructure scheme can be trusted to be the entity that it purports to be. For example, if Alice publishes her public key for Bob to use in establishing a secure communication with Alice, Bob must know that it is in fact Alice who has published that public key and not an impostor. If Alice presents Bob with an X.509 certificate from Trent and Bob trusts Trent, then Bob can rely on Alice's public key being the correct key. To minimize the risks associated with such certificates, some certificate authorities limit the valid period for the certificate. For example, two fields of an X.509 certificate define valid not before and valid not after boundaries for the validity of the X.509 certificate. Thus, if the recipient cannot compare the valid not before and valid not after boundaries against a trusted time, the recipient cannot decide whether or not to trust the certificate. Furthermore, depending on the extent to which the recipient trusts its own analysis of the validity of the certificate.

Kerberos is another security protocol that makes heavy use of time-stamps. Kerberos is described in J. Kohl, C. Neuman. "RFC 1510—The Kerberos Network Authentication Service (V5)" September 1993. In Kerberos timestamps are used as nonces (numbers used once) during a mutual authentication phase of the protocol. This use of timestamps requires that the clocks on all machines participating in the Kerberos network must be synchronized to within a few minutes. Typically, the synchronization is done by installing an NTP (NTP is described in greater detail herein below) client on the various participating computers. The time clocks on the participating machines are then synchronized just like a regular PC synchronizes with an external time server. The reliability and accuracy of the current calendar time thus obtained by a participating computer is very important to the usefulness of the Kerberos protocol. Therefore, the lack of reliable time on devices that are not able to maintain independent calendar time clocks would present a challenge for the use of Kerberos on such devices.

There are other transactions that cannot be carried out securely unless the computing device carrying out the transaction has an accurate and reliable measure of time. For example, many transactions require that a time-based log be maintained indicating when a particular transaction occurred. Such logging cannot be performed unless accurate and reliable time values are available. There are also transactions that a device may not want to perform unless the device has a reliable measure of time.

Smart cards are one class of devices that cannot independently maintain a local time clock. Smart cards do not have internal power sources. Thus, when a smart card is not connected to an external device such as a smart card reader, it is unable to execute a clock function. Smart cards are devices that are used to increase the level of security available for computer-based activities. For example, smart cards may be used in the encryption and decryption of messages between two entities, smart cards may be used for the authentication of users of a service, and smart cards may hold sensitive information about one or more actors in a transaction.

Many smart cards are programmed with a time stamp of manufacturing, for example, by having it written into the non-volatile memory of the smart card. However, it is quite possible that a considerable arbitrary duration of time passes between the manufacturing of a card and its subsequent issuance. Thus, the static time value stored at manufacturing is of little use in most transactions that require a measure of current time. Therefore, even though the smart card may determine relative time while it is powered up, the smart card is not able to relate that relative time to actual calendar time without some accurate and reliable reference time.

Obtaining time is not the only problem. Obtaining accurate and reliable time is also important. For example, the very purpose of X.509 certificates is to establish trust between two entities. Thus, if current time on the receiving entity is required to properly process the X.509 certificate, the reliability of the time measure is crucial. Therefore, it is desirable to obtain a measure of time on a device that cannot maintain its own clock using a mechanism that cannot be compromised.

From the foregoing it will be apparent that there is still a need for an improved method to obtain an accurate and reliable measure of time on a device that cannot maintain an independent time clock thereby overcoming aforesaid deficiencies in the ability to process transactions and security procedures that require an accurate and reliable measure of time on such devices including smart cards.

SUMMARY OF THE INVENTION

In a preferred embodiment, the invention provides a mechanism for enforcing a time-based transaction policy on a device that is not capable of independently maintaining a local time clock. The invention acquires time from one or more network-attached time sources and estimates the current time based on the received time measurements and provides for the computation of a reliability index associated with the estimated current time. An embodiment of the invention makes use of the estimated current time and the associated reliability index to enforce a transaction policy for time-based transactions.

Even devices lacking the capability to independently maintain a local time clock, if using the invention, may be used to participate in time-based transactions that hitherto would not be possible without a reliable and accurate measure of calendar time.

The method according to the invention may include steps for establishing a communications channel to each of one or more network-attached time sources; using each of one or more communications channels to inquire from each of the one or more network-attached time-sources as to the current time; receiving the current time from the one or more network-attached time-sources; using the received current times from the one or more network attached time-sources to estimate a current time and to calculate a reliability index for the estimated current time; and using the estimated current time and the reliability index associated with the estimated current time to enforce a time-based transaction policy.

In another aspect of the invention, a device not capable of independently maintaining a local time clock includes a memory having instructions for causing a CPU to perform the steps of the aforementioned method.

Other aspects and advantages of the present invention will become apparent from the following detailed description, taken in conjunction with the accompanying drawings, illustrating by way of example the principles of the invention.

DETAILED DESCRIPTION OF THE INVENTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Introduction

As shown in the drawings for purposes of illustration, the invention is embodied in a novel system and method for providing accurate and reliable measures of time on devices that cannot maintain independent time clocks. A system and method according to the invention provides a method in which a device that cannot maintain an independent clock, for example, because of the lack of a battery, obtains an accurate and reliable measure of time from an external source using a secure communications channel (hereinafter, devices that cannot maintain an independent time clock will be referred to as clockless devices). A level of trust is associated by the clockless device based on the particular time source and the manner in which the time was obtained. The device uses that level of trust to determine which time-dependent transactions to complete (herein, time-dependent refers to requiring a measure of time) and to apply security policies for time-dependent transactions, including the processing of digital certificates.

For the purpose of providing an example and description of one embodiment of the invention, the invention is primarily described herein as used with a smart card. A smart card is one example of a clockless device. Other examples include embedded processors that obtain their power from external sources.

Figure 1:
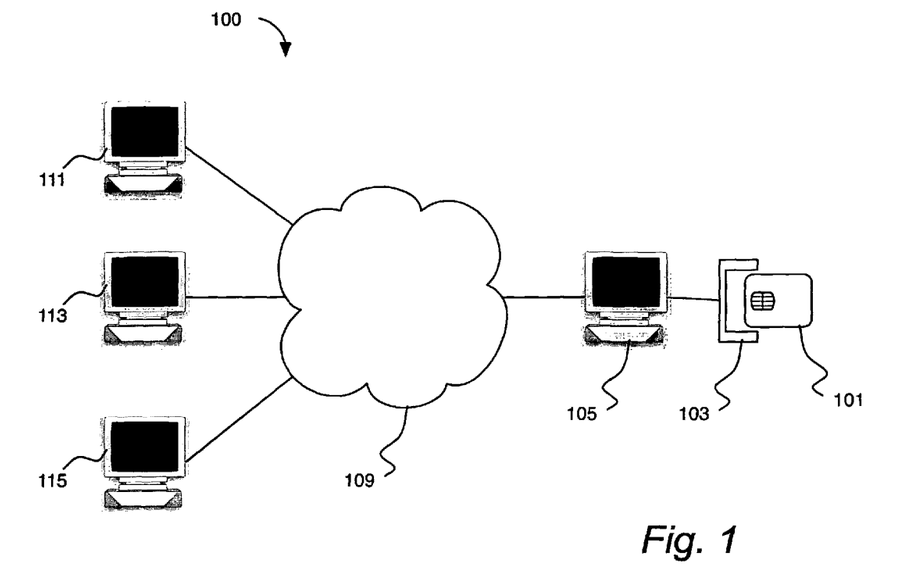
FIG. 1 is a schematic illustration of one possible operating environment in which the present invention may be employed.

FIG. 1 is a schematic illustration of one possible operating environment 100 in which the present invention may be employed. In the operating environment 100 a smart card device 101 may be used to provide secure communication with several remote entities 111, 113, 115. The smart card 101 is connected to a computer network 109, for example, the Internet. The smart card 101 may be connected to the computer network 109 via a personal computer 105 that has attached thereto a card reader 103 for accepting a smart card. However, the smart card 101 may be connected in a myriad of other ways to the computer network 109, for example, via wireless communication networks, smart card hubs, or directly to the computer network 109. The remote node 111 may be a computer system of some sort capable to implement some functionality that may either seek access to information on the smart card 101 or to which a user may seek access. For example, the remote node 111 may be executing software to send messages that a user of the smart card 101 is seeking to obtain access to. The smart card 101 may then provide some functionality to assist in the decryption and authentication of the computer 111. One aspect of that exchange may be the receipt of a digital certificate from the computer 111.

Conventional smart cards based on ISO 7816 communication standards use special reader device drivers to connect to host computers, and special middleware so that other mainstream applications can interact with the smart card. This model hinders seamless integration with remote Internet applications. For example, the model limits the portability of smart card based solutions to only those hosts that have the required middleware. Furthermore, the model imposes the additional burden on the remote applications that now have to adhere to smart card specific protocols. Finally, this model relegates smart cards to being passive listeners; the smart cards cannot initiate connections to external servers, but instead wait for commands from external applications.

Since smart cards do not have an internal battery to keep track of time, the time value has to be acquired from an external reliable time source. This fact about smart cards requires an end-to-end secure network connection with the remote source. One solution for providing the secure connection is accomplished at the expense of modification at the remote server and installation of middleware software at the local host to which the smart card is connected. Both these requirements limit the viability of such a solution. For example, a time-server could be modified to pack encrypted data in APDU format that the conventional smart cards can then decrypt. However, few publicly available time-servers would support APDU packing.

Another alternative is to use standard communication protocol between an unmodified remote time-server and the host middleware, and then encrypted APDU between host middleware and the smart card. This protocol conversion, however, breaks the end-to-end security model. It assumes the host can be trusted. In today's networked world where viruses, Trojans, and malware are freely available and distributed, this assumption to trust the host computer is no longer valid. PCs are notorious for their hardware as well as software vulnerabilities. It is fairly easy to compromise most applications running on a PC. Data, e.g. current date and time, sent to the smart card by such applications can, therefore, not be trusted.

In one embodiment of the invention, a clockless device, e.g., a network smart card 101, is a device that is capable of providing end-to-end secure communication to a remote server on the network 109 without requiring any modifications to the remote server, e.g., server 113 or server 115, or to the host computer 105. Network smart cards and their use are described in greater detail in co-pending and co-assigned U.S. patent application Ser. No. 10/848,738, entitled, "SECURE NETWORKING USING A RESOURCE-CONSTRAINED DEVICE" of HongQian Karen Lu, Michael Andrew Montgomery, and Asad Mahboob Ali, the entire disclosure of which is incorporated herein by reference.

The scenario of FIG. 1 is presented here merely for the purpose of providing an example and must not be taken to limit the scope of the invention whatsoever. Only the imagination of designers limits the myriad of possible deployment scenarios and uses for the invention.

The scenario of FIG. 1 is useful to illustrate the invention. However, the invention should not be limited to smart cards and the use of smart cards. FIG. 1 provides a useful illustration in that a smart card 101 is a secure device to which a user must gain access for obtaining information stored thereon.

Figure 2:
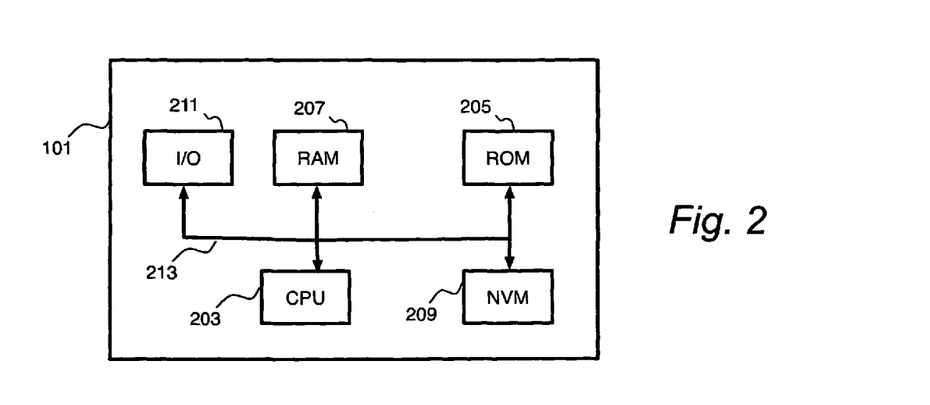
FIG. 2 is a schematic illustration of an exemplary architecture of a computer system or other device, for example, a smart card, that lacks an independent time clock and is therefore a device on which the invention may operate.

FIG. 2 is a schematic illustration of an exemplary architecture of a computer system or other device, for example, a smart card, that lacks an independent time clock and is therefore is a device which is suitable for implementations of the invention. The device 101, e.g., a smart card, has a central processing unit 203, a read-only memory (ROM) 205, a random access memory (RAM) 207, a non-volatile memory (NVM) 209, and a communications interface 211 for receiving input and placing output to a device, e.g., the card reader 103, to which the smart card device 101 is connected. These various components are connected to one another, for example, by bus 213. During operation, the CPU 203 operates according to instructions in the various software modules stored in the ROM 205.

Figure 3:
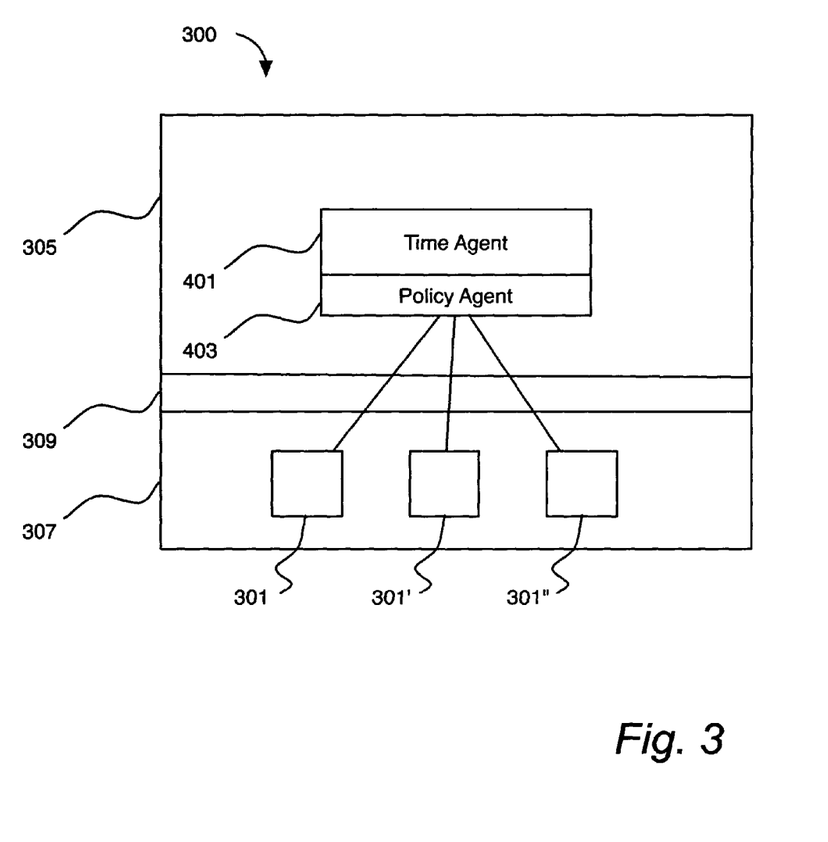
FIG. 3 is a block diagram of an exemplary software architecture that one may find implemented on a clockless device according to the invention.

FIG. 3 is a block diagram of an exemplary software architecture 300 that one may find implemented on a clockless device 101. The software architecture 300 includes several application programs 307, e.g., application programs 301, 301', and 301". These interface with other computer systems or other computer hardware through some communications interface software (not shown). In the case of smart cards, the application programs 301 would typically be loaded into the non-volatile memory 209. However, in other scenarios an application program may be permanently written onto the smart card at manufacture by having it stored on ROM 205. During execution of an application program, certain portions of the application program are loaded into the RAM 207.

In this example, several application programs 301 are executed by the CPU 203 under the control of instructions of a system software 305. The system software 305 may, for example, include a Javacard Virtual Machine as found on the Cyberflex smart card family from Axalto Inc. or the interpreter of a smart card implementing a .NET CLI (Common Language Infrastructure) as found in the .NET smart card technology from Axalto Inc. (www*axalto*com/infosec/ NET*faq*asp). In alternative embodiments, the application programs 301 are compiled into executable code and do not require further interpretation by the interpreter. However, in such embodiments, some operating system program that would take the place of the interpreter would manage the job control.

According to one embodiment of the invention, the system software 305 contains a time agent 401 and a policy agent 403. The time agent 401 is a component that provides the current time value and a reliability index for that time value. The time-dependent functions of applications 301 residing on the device 101 may not all have the same requirement for reliability of the time source and the granularity of time. For example an X.509 certificate parser may not require the time to be available in milli-second granularity. Because an X.509 parser checks for a validity period of X.509 certificates that may have a spread of several years, even time that is accurate to minutes will suffice. However, some financial applications may require a tighter degree of accuracy. The mapping between the level of service provided by the card and the degree of reliability of a time source is managed by the time policy on each smart card. If the smart card is used as part of a system which implements algorithms for maintaining data integrity in distributed systems through synchronized locking of data items a very accurate and precise time measure may be required. Therefore, policies may be set to determine which time-dependent functions may be executed given a particular time value and reliability index. The policy agent 403 enforces these policies. The policy-agent component then interprets this reliability index to define a card-specific, or even application-specific time policy. This allows greater flexibility in developing applications that manage the risk associated with time-dependent smart card transactions. The policy agent 403 and time agent 401 are both described in greater detail herein below.

The application programs 301 may access functions provided by the smart card system software 305, such as by issuing calls through an application program interface 309, for example, the policy agent 403 and the time agent 401. While the illustration of FIG. 3 illustrates the policy agent 403 as a layer between the application programs 301 and the time agent 401, that is not a necessary arrangement. In one embodiment the policy agent 403 may call upon the time agent 401 to obtain current time measurements and subsequently enforce policies by requiring time-dependent applications 301 to make calls to the policy agent 403 in order to become authorized to proceed with a particular time-dependent function. However, in other embodiments the time-dependent applications 301 may call the time agent 401 directly to obtain current time values and then call upon the policy agent to determine whether to proceed with a transaction.

Time Agent 401

In one embodiment of the invention the time agent 401 is a software module stored in the NVM 209 and containing instructions to cause the microprocessor 203 to obtain a new value for the current time from an external source using the I/O module 211 and connections to remote devices connected to the Internet 109.

The time agent 401 may obtain values for current calendar time from multiple time sources using several different techniques. FIGS. 4 through 7 are flow charts illustrating examples of several such different approaches for obtaining calendar time. FIG. 8 is a flow chart illustrating an algorithm by which the time agent 401 and policy agent 403 may estimate the current calendar time by combining several different approaches for obtaining measurements for current calendar time from several sources and associating a reliability index with that combined current calendar time estimate.

Figure 4:
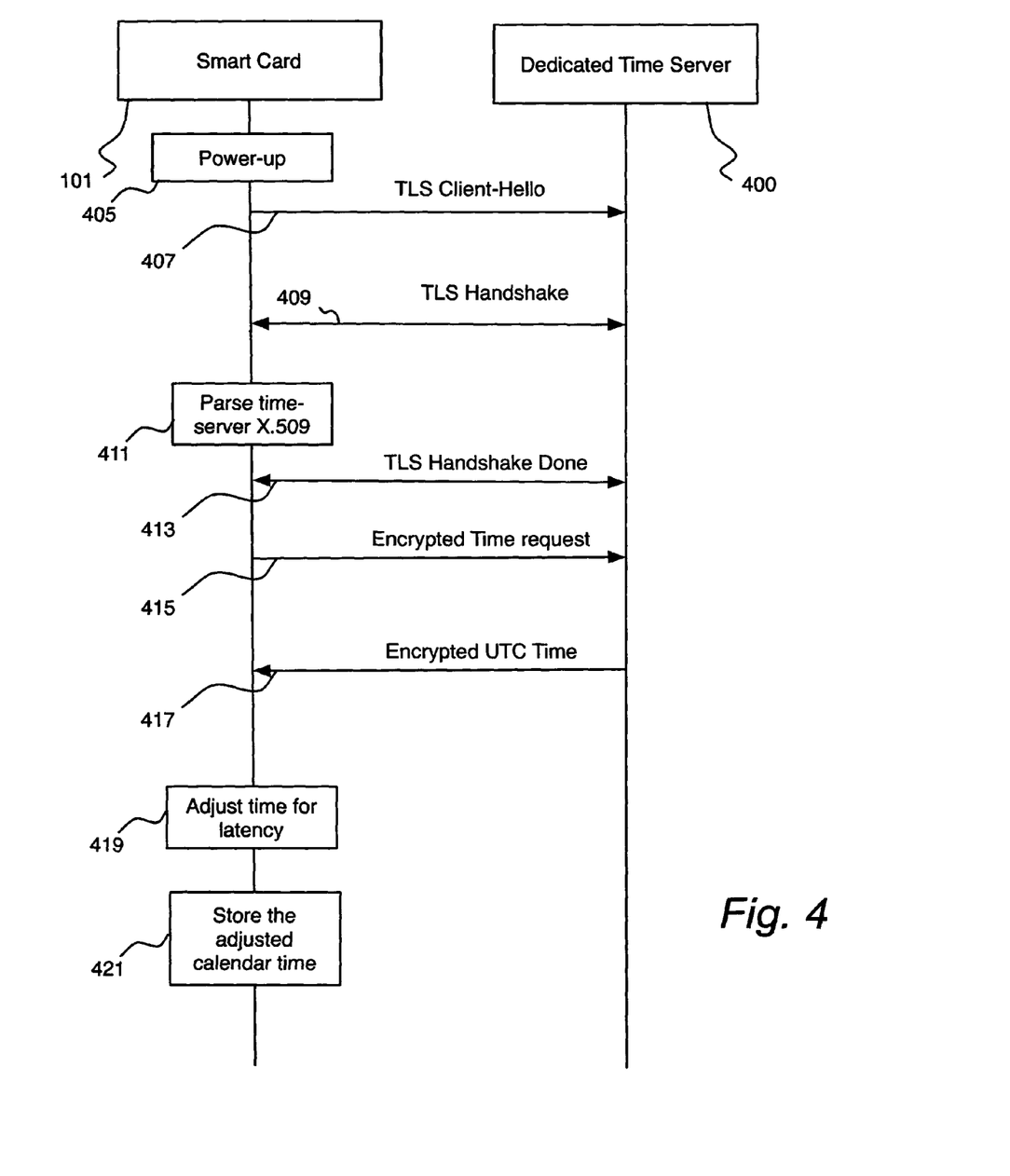
FIG. 4 is a message sequence diagram illustrating one operation of the first alternative embodiment of a time-agent according to the invention.

The time agent 401 may obtain a value for current calendar time from a dedicated time-server using a TLS connection. FIG. 4 is a message sequence diagram illustrating one operation of the time-agent 401 according to the invention in which the time-agent 401 obtains a current measure of calendar time from a dedicated server 400 using a TLS connection. To be accurate, FIG. 4 illustrates the operation of the smart card 101, as directed by the time agent 401, to cause a message flow with a remote dedicated time-server 400 over a TLS connection.

For purposes of illustration, the dedicated time-server is depicted as node 111, which is connected to the Internet 109. In practical implementation, there may be many dedicated time-servers deployed on the Internet 109 to provide services to time agents 401 operating on clockless devices 101. The dedicated time-server 400 is a server on the Internet, explicitly deployed by a service-provider institution to provide time to smart cards over a secure end-to-end connection. In the context of FIG. 1, the dedicated time-server 400 may be one of the computers 111, 113, or 115, for example. The dedicated time-server 400 uses Network Time Protocol [NTP] (David L. Mills, RFC 1305, "Network Time Protocol (Version 3) Specification, Implementation and Analysis", IETF Network Working Group.) to synchronize itself with other NTP time-servers on the Internet 109. The dedicated time-server 111 then passes the time as Coordinated Universal Time [UTC] to smart cards 101 using a simple string format. The smart cards do not have to support the relatively complex NTP client stack. UTC is documented in RFC 3339 (G. Klyne, C. Newman "RFC 3339—Date and Time on the Internet: Timestamps", July 2002. IETF Network Working Group).

Step 405: The smart card 101 is powered up. The smart card 101 checks a dedicated file in its NVM 209 to lookup the URL of a dedicated time-server 400.

Step 407: The smart card 101 sends a client-hello message to initiate a TLS connection to the dedicated time-server 400. The smart card is the client in the TLS connection.

Step 409: The smart card 101 and the dedicated time-server 400 exchange TLS handshake messages.

Step 411: As part of this TLS handshake, the smart card 101 parses an X.509 certificate sent by the dedicated time-server 400. The certificate is assumed to be non-expiring so the smart card 101 need not verify its validity period; the smart card 101 assumes that the certificate from dedicated time-server 400 does not expire. Parsing the X.509 certificate allows the smart card 101 to confirm that smart card 101 is indeed communicating with the particular dedicated time-server 400 the address of which has been stored in the NVM 209 of the smart card 101.

Step 413: Once the identity of the dedicated time-server 400 is confirmed the smart card 101 and dedicated time-server 400 proceed with a handshake procedure consisting of a sequence of messages (collapsed in FIG. 1 to Step 413). At the conclusion of these messages the TLS handshake phase is completed and the session keys are exchanged between the smart card 101 and the dedicated time-server 400. Both the dedicated time-server 400 and the smart card 101 can now communicate securely using the agreed upon session keys. Details of the TLS handshake are available from the TLS 1.0 Specification from IETF and are documented in RFC 2246 (Request for Comments: 2246, "The TLS Protocol", January 1999, IETF Network Working Group).

Step 415: The smart card 101 uses the session keys to encrypt a request for the current time and transmits that request to the dedicated time-server 400.

Step 417: Having received the session keys and the encrypted request for the current time, the dedicated time-server 400 responds by sending the value of the current calendar time to the smart card 101 in UTC format over the secure TLS connection.

Step 419: The smart card 101 adjusts the time value for the latency time in the communication. The latency adjustment may be done using the half-round-trip formula:

$$T = T_1 + ((R_1 - R_0)/2)$$

Where T is the adjusted time, $T_1$ is the actual time value received in step 417, $R_0$ is the relative time on smart card 101 when time request was sent in step 415, and $R_1$ is the relative time on smart card when UTC time was received in step 417.

Step 421: The smart card 101 stores the current calendar time in memory. Typically, the smart card 101 stores the adjusted calendar time from the server 400 in either RAM 207 to have the time available during the current powered-up session so that the adjusted calendar time is available to the algorithm in FIG. 8 as one of the time measurements T1 817, T2 821, T3 825, or T4 829.

Having completed the procedure, the smart card 101 has the adjusted current time value stored in one of the time measurements T1 817, T2 821, T3 825, or T4 829. While the card is powered on, the internal clock ticks keep track of changes to that time measurement.

In an alternative approach, the smart card 101 obtains a current value of calendar time from a dedicated server 500 by using symmetric keys that have been written to the smart card 101 at personalization time. In the context of FIG. 1, the dedicated time-server 500 may be one of the computers 111, 113, or 115, for example During personalization time of the smart card 101, a key 502 is written to the NVM 209. The key 502 has a symmetric counterpart key 502' stored at the dedicated time-server 500. Symmetric keys is one form of shared secrets and may be the preferred shared secret for use in obtaining time from a dedicated server 500 using a shared secret. However, other shared secrets may be employed in alternative implementations.

Figure 5:
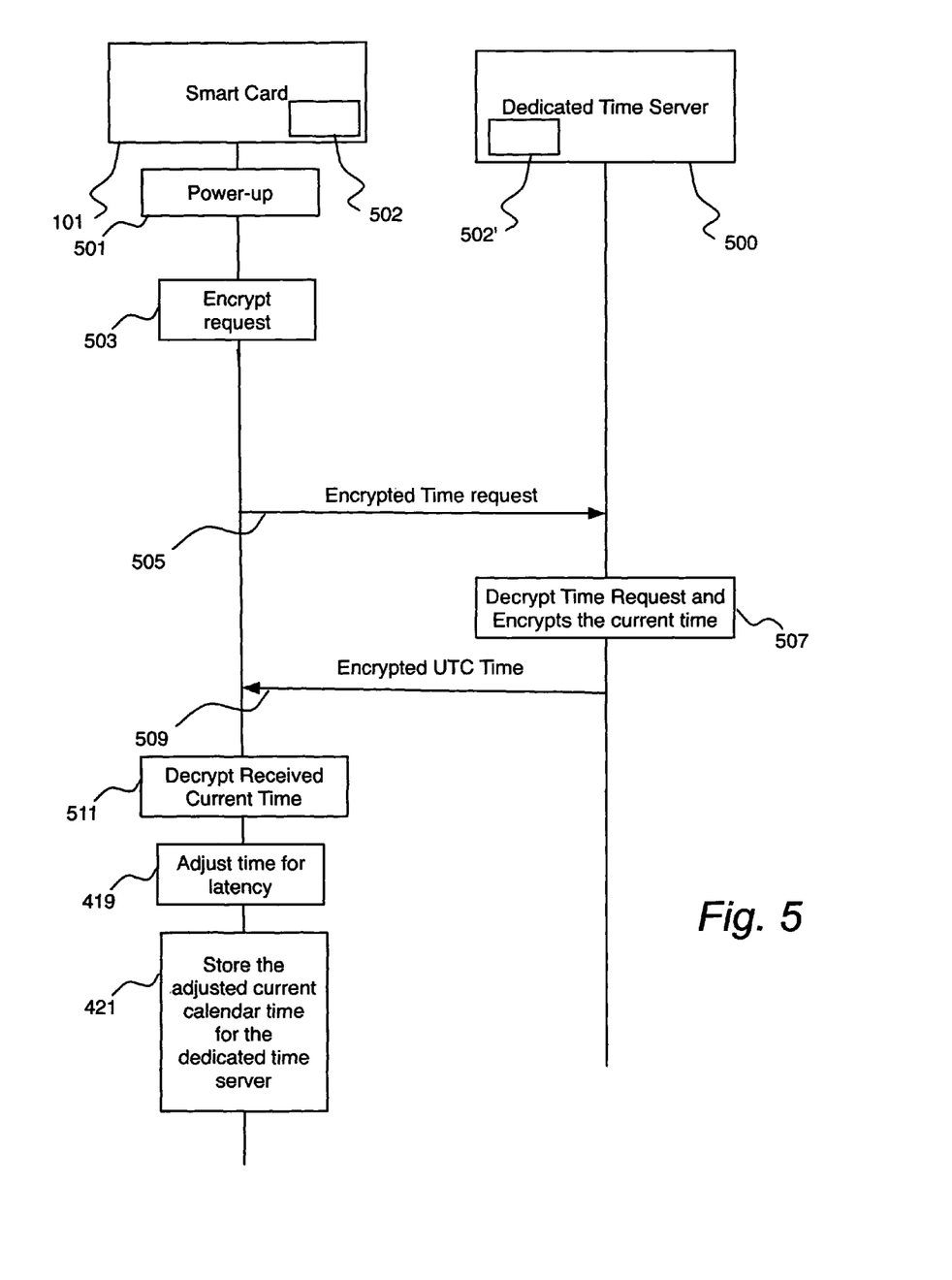
FIG. 5 is a timing sequence diagram illustrating the operation of a smart card and a dedicated time-server implementing a method for providing the smart card with a value of current calendar time using the symmetric keys.

FIG. 5 is a timing sequence diagram illustrating the operation of a smart card 101 and a dedicated time-server 500 implementing a method for providing the smart card 101 with a value of current calendar time using the symmetric keys 502 and 502'.

Step 501: As the smart card 101 is powered up the smart card 101 retrieves four pieces of information from a dedicated file in the NVM 209:

a. The URL of the dedicated time-server 500.
b. The identifier for the encryption algorithm to be used for symmetric encryption of messages sent and received from the time-server 500, e.g., DES, 3-DES, AES, etc.
c. An identifier for a digest algorithm to compute MAC, e.g., SHA-1, MD5.
d. The symmetric key 502. This key is shared with the corresponding dedicated time-server.

Step 503: The smart card 101 encrypts a simple time request using the encryption algorithm and shared key retrieved from the NVM 209.

Step 505: The smart card 101 transmits the encrypted message to the dedicated time-server 500 as an HTTP request over an HTTP connection.

Step 507: The dedicated server 500 decrypts the time request using the corresponding decryption algorithm and the key 500'. If the message was received correctly, the dedicated time-server 500 encrypts the current time.

Step 509: The dedicated time-server 500 transmits the encrypted current time to the smart card 101 in response to the HTTP request. Step 511: The smart card 101 decrypts the current time value received in step 509.

Like in the Example illustrated in FIG. 4, the received time is adjusted for latency, step 419, stored in memory for use by the algorithm of FIG. 8, step 421.

In another alternative method for obtaining a current calendar time measurement, the smart card 101 obtains a current calendar time value from a general-purpose time-server 600 over the Internet 109. Government, research, or even commercial organizations provide servers connected to the Internet 109 for providing time. One purpose is to provide computers connected on the Internet 109 a mechanism by which to synchronize their clocks. The general-purpose time-servers 600 provide time to network computers using a variety of protocols. Some of these protocols include:

Network Time Protocol [NTP] is the most widely used protocol for synchronizing system time on a computer. It allows time to be synchronized to a very high degree of accuracy. Version 3 of the protocol is documented in RFC 1305 (RFC 1305 "Network Time Protocol (Version 3) Specification, Implementation and Analysis," March 1992,IETF Network Working Group). Most time-servers provide time through the NTP protocol on port 123, to which an NTP client can connect. The NTP protocol allows use of multiple time-servers where each server is designated as a Stratum 1, Stratum 2, or higher number server. The higher the stratum designation of a server, the lesser the accuracy of time the time-server provides. Smart cards can obtain time using the NTP protocol provided they have an implementation of an NTP client stack.

The Simple Network Time Protocol [SNTP] is a simplified form of NTP where only a single NTP server is used instead of averaging time from multiple servers. The SNTP protocol is documented in RFC 2030 (RFC 2030, "Simple Network Time Protocol (SNTP) Version 4 for IPv4, IPv6 and OSI," October 1996, IETF Network Working Group,)

The Daytime Protocol is widely used by a variety of low-end computers and embedded devices. The Daytime Protocol sends time using only the ASCII character set. The Daytime Protocol is documented in RFC 867 (RFC 867, "Daytime Protocol," May 1983, IETF Netowrk Working Group) An example time string from a NIST time-server is given below. See RFC 867 for explanation of various fields of this string. The most important fields that give date and time are underlined. An example of a Daytime Protocol response string is:

53494 05-05-04 22:30:03 50 0 0 303.9 UTC(NIST)*

The Time Protocol returns a 32-bit unformatted binary number that represents the time in UTC seconds since Jan. 1, 1900. This protocol is documented in RFC 868.

Because Daytime Protocol and Time Protocol simply require a parser to extract current date and time values, these protocols are suitable for use in smart cards. The connection to the time-server can be over HTTP with a specific port. For example NIST maintains the several servers that return time in Daytime Protocol over HTTP using port 14.

Some Internet servers report time in their own format. For example the US Naval Observatory provides time in UTC and all four US time zones.

Figure 6:
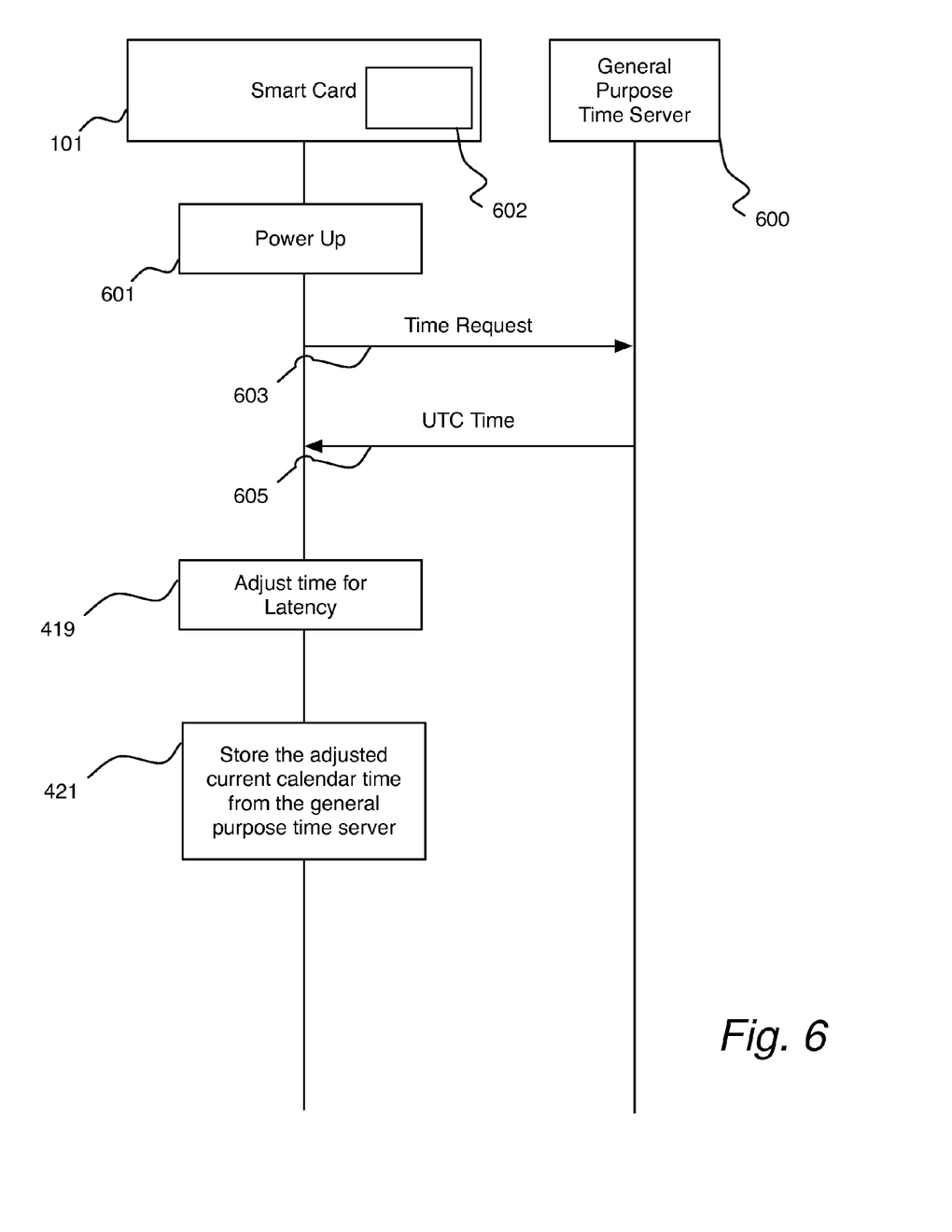
FIG. 6 is a time sequence diagram illustrating one possible process by which a time-agent according to the invention may cause a smart card to use general-purpose time-servers to obtain a current value of calendar time.

FIG. 6 is a time sequence diagram illustrating one possible process by which a time-agent 401 may cause a smart card 101 to use a general-purpose time-server 600 to obtain a current value of calendar time. The smart card is preprogrammed with the URLs of various general-purpose time-servers. The URLs of the general-purpose time-servers may, for example, be preprogrammed in the NVM 209 into a general time-server URL file 602.

Step 601: On power-up the time-agent 401 of the smart card 101 searches the general time-server URL file 602 in the NVM 209 to get the URL of at least one general-purpose time-server 600. The general time-server URL file 602 may also contain information about the transport protocol (HTTP or HTTPS) and port number used in accessing the particular general time-servers.

Step 603: The smart card 101 sends a request for the current time to a general purpose time-server, time-server 600.

Step 605: The time-server 600 sends UTC time back to the smart card 101. The UTC time is adjusted for transmission latency, for example, using the half-round-trip time logic described herein above, step 419.

Depending on the capabilities of the general-purpose time-servers 600, the request 603 and the response 605, may be either in HTTP or HTTPS. Most general-purpose time-servers use HTTP and not HTTPS to provide time. Since the time acquired using unencrypted HTTP connections may not be as reliable as the one from a dedicated server, the use of this time is governed by the time management policies defined for the smart card.

Finally the adjusted time measurement obtained from the general purpose time server is stored in memory for use in the algorithm of FIG. 8, step 421.

The methods described herein above for obtaining calendar time measurements may also be used to obtain calendar time measurements from sources that are not particularly deployed for the sole purpose of providing calendar time. For example, many web sites provide a calendar time to give a measure of the currency of the information provided by the web site. News and weather sites are examples of such web sites.

In another alternative embodiment, the time-agent 401 provides instructions to the smart card 101 to obtain the time from the host computer to which the smart card 101 is connected. Returning briefly to FIG. 1, one way of deploying a smart card 101 is to connect the smart card 101 via a reader 103 to a host computer 105. In this embodiment, the smart card 101 obtains the time from the host computer 105.

Figure 7:
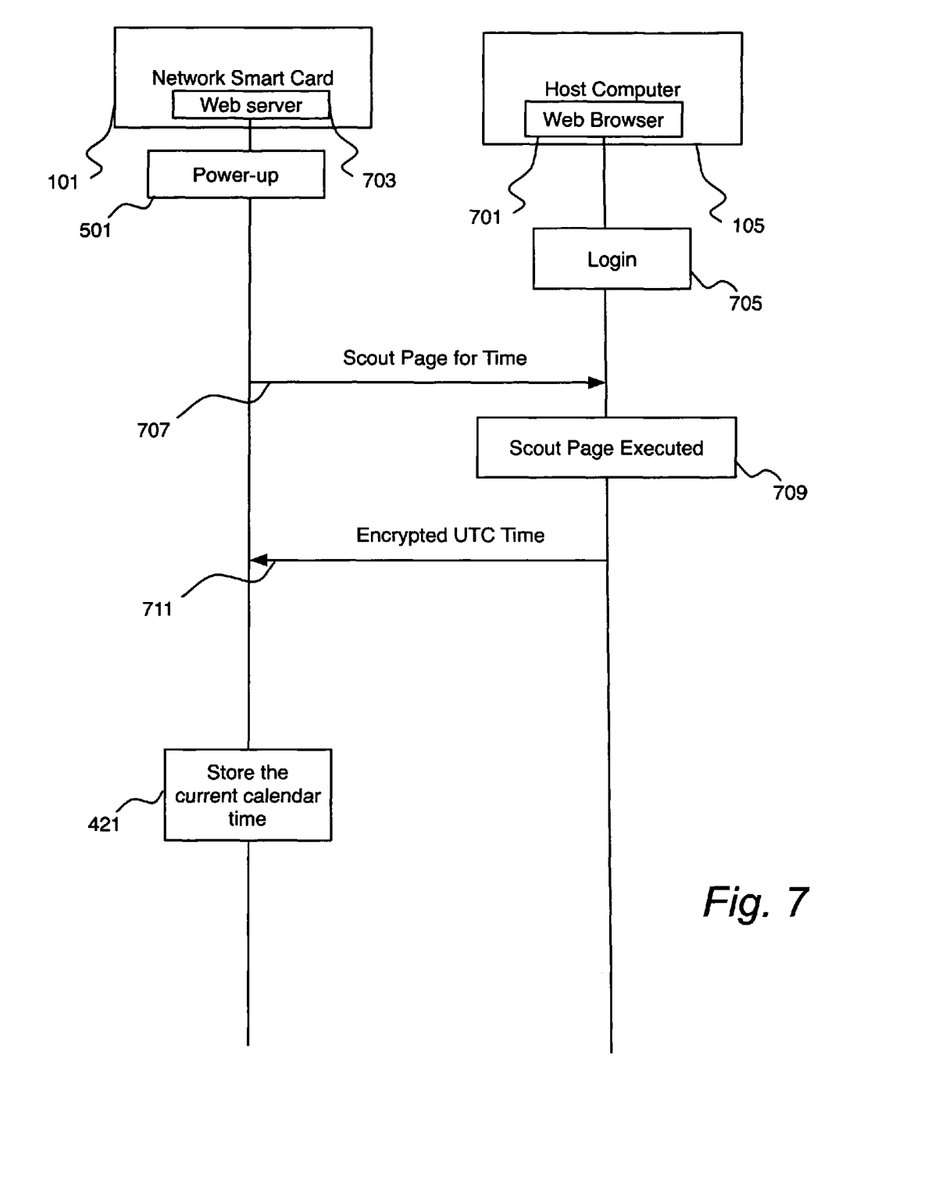
FIG. 7 is a time sequence diagram illustrating the embodiment of the invention in which the time-agent according to the invention obtains time from the host computer to which the smart card on which the time-agent is executing is connected.
Figure 8:
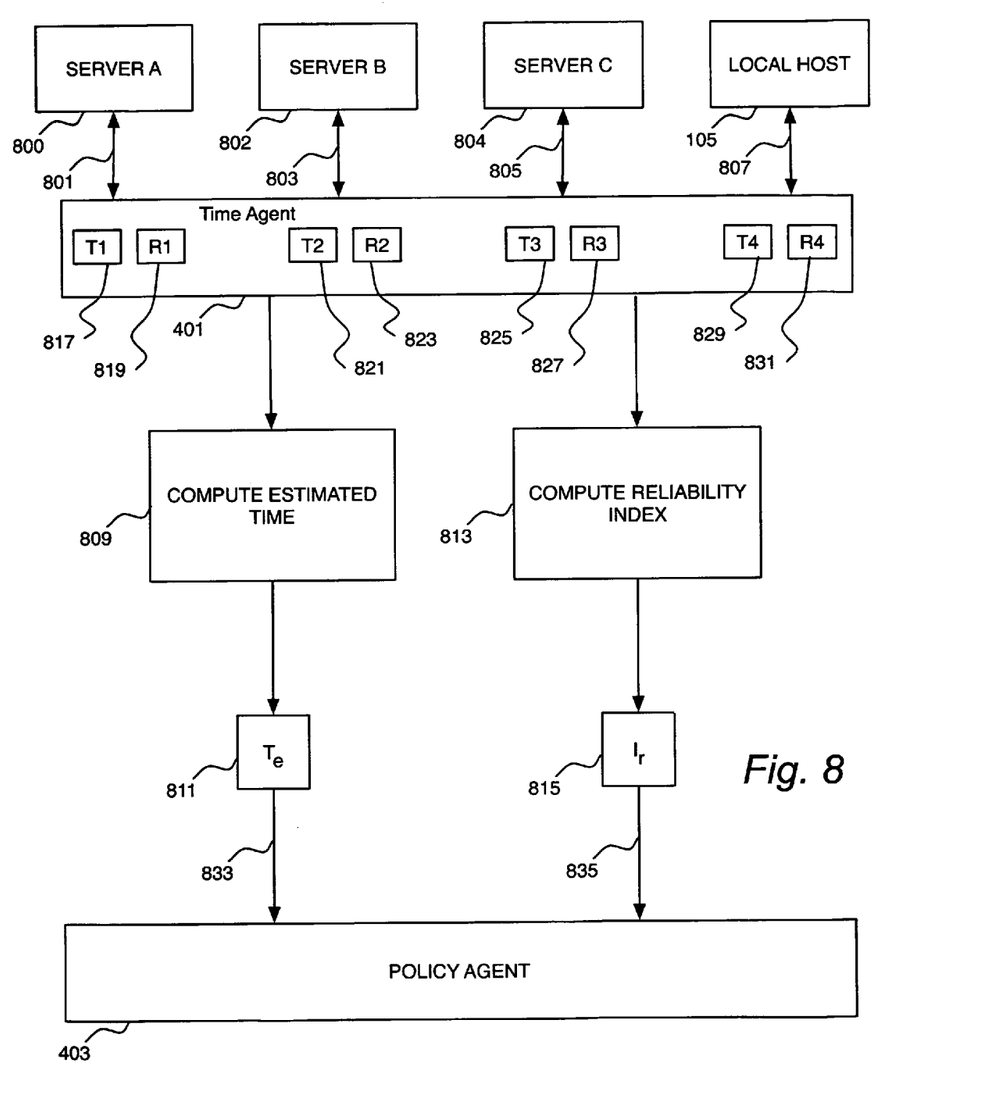
FIG. 8 is a flow chart illustrating an algorithm by which the time agent and policy agent may obtain one time estimate for current calendar time by combining several different approaches for obtaining measurements for current calendar time from several sources and associating a reliability index with that current calendar time estimate.

FIG. 7 is a time sequence diagram illustrating the embodiment of the invention in which the time-agent 401 obtains time from the host computer 105. Although getting time from a host computer 105 is considered a breach of security for conventional APDU cards, a Network Smart Card can mitigate this risk to some degree by using a relatively secure application on the host 105, namely, a standard web browser 701. The web browser 701 can establish a secure connection over HTTPS with a web server 703 running on the smart card 101. The time value may be computed in the web browser 701 and transmitted to the web server 703 of the smart card 101. Because a web server 703 does not initiate a connection, the web server 703 waits for a user to login to the smart card 101 via the web browser 701. This initial connection can be used by the smart card 101, under the direction of the time-agent 401, to request the current time from the web browser 701, before proceeding with the login. This additional roundtrip to obtain time is not visible to the user. FIG. 7 outlines the steps to achieve this.

Step 705: A user opens a standard web browser 701 like INTERNET EXPLORER web browser or MOZILLA FIREFOX web browser, and connects to the Network Smart Card 101 over an HTTPS connection. The smart card 101 is acting as a web server, i.e., the smart card 101 executes a software module that acts as a web server, here, web server 703. Because the smart card 101 runs the web server 703, the smart card 101 does not need to parse an X.509 certificate, a task that would have required prior knowledge of time.

Step 707: Normally the web server 703 on the smart card 101 sends back a login page to the web browser 701 through which a user can enter the PIN for authentication. However, in case the smart card 101 requires a new measure of the current time from the host device 105, the web server 703, upon obtaining a login request, sends back a scout page to obtain the current time. The scout page has no visible content. Rather the scout page consists of a JavaScript code to obtain the time, a hidden form to send this time value back to the card, and some HTML to automatically trigger the submission of this form. The scout page is illustrated below in Table 1.

Step 709: The web browser 701 executes the scout page, i.e., the JavaScript code, to retrieve the current UTC time from the system clock of the host computer 105.

Step 711: The scout page automatically triggers the transmission of the current UTC time to smart card 101.

Because the host computer 105 and smart card 101 are located very close to each other, typically there would not be a need to adjust for latency. However, in alternative deployments, a network smart card 101 may be located remote from the host device 105 from which time is obtained in the manner illustrated in FIG. 7. In such a deployment, it may be necessary for the smart card 101 to execute a latency adjustment algorithm, e.g., the half round-trip algorithm described herein above.

Like in the Example illustrated in FIG. 4, the received time may be stored in memory, step 421, for use by the algorithm of FIG. 8.

Table 1 below contains sample code for the JAVASCRIPT code of the scout page:

TABLE 1

Scout Page JavaScript code to Obtain Time on a Host

| 1 | <SCRIPT LANGUAGE="JavaScript"> |
| 2 | function sendTime( ) { |
| 3 | var timeValue; |
| 4 | curDate = new Date( ); |
| 5 | timeValue= curDate.toUTCString( ); |
| 6 | timeForm.utcTime.value = timeValue; |
| 7 | timeForm.submit( ); |
| 8 | } |
| 9 | </SCRIPT> |
| 10 | <BODY OnLoad="sendTime( )"> |
| 11 | <FORM method="post" name="timeForm" action="../updateTime"> |
| 12 | <INPUT type="hidden" name="utcTime" value=""> |
| 13 | </FORM> |
| 14 | </BODY> |

Line 1 is the start of JAVASCRIPT code section and line 9 is the end. Line 2 defines a sendTime( ) function to get time and submit it to card, Line 5 converts a current local time into UTC time string format. Line 6 sets this UTC time to form element, and line 7 submits the form. Line 10 indicates that the sendTime( ) function should be called when page loads. Lines 11 to 13 define a form with hidden field, and its action URL.

In the embodiment illustrated in FIG. 7, the web browser 701 establishes a secure HTTPS connection to the web server 703 of the smart card 101. The time value is transmitted to the smart card 101 without degrading the user experience. Because the interrogation concerning calendar time is hidden from the user, the user is not even aware that the additional roundtrip has occurred. This provides a relatively secure way of transmitting the calendar time value to the smart card 101. However, this approach, because of the difficulty in ensuring that the calendar time on the host device 105 is correct, should either be used when the other approaches are not available or in conjunction with the other approaches. The approach of obtaining the calendar time from the host device may not be allowed to carry the same reliability value as the method of obtaining calendar time from a dedicated server or, even, a general purpose time-server.

FIG. 8 is a flow-chart illustrating one embodiment of the invention in which the various methods described herein above in conjunction with FIGS. 4 through 7 for obtaining current calendar time from different time sources may be combined to obtain an estimate of the current calendar time and assign a reliability index to the estimated time.

Step 801: Time agent 401 connects to a server 800 and receives a time value T1 817. This server 800 has an assigned reliability of R1 819.

Step 803: Time agent 401 connects to a server 802 and gets a time value T2, 821. This server 802 has an assigned reliability of R2, 823.

Step 805: Time agent 401 connects to a server 804 and gets a time value T3, 825. This server 804 has an assigned reliability of R3, 827.

Step 807: Time agent 401 connects local host computer 105 and gets a time value T4, 829. This host computer 105 has an assigned reliability of R4, 831.

The various reliability values R1, R2, R3, and R4 may be stored in the NVM 209. Each of the servers 800, 802, and 804 may be any combination of servers 400, 500, and 600 of the examples provided herein above. For example, in one execution of the time-agent 401, the time-agent 401 may obtain all its time measurements from dedicated time-servers using a TLS connection, e.g., time-server 400. In another example, the time-agent 401 obtains time solely from general purpose time-servers 600. In yet another example, the server 800 is a dedicated time-server, the server 802 is a general purpose time-server, and the server 804 is web site that not only provides time measurement values but also serves other purposes. There is no limit on the possible combinations that a time-agent 401 may employ. In an embodiment, the time-agent 401 may select the servers to inquire for current calendar time depending on the reliability index associated with the time measurement provided by the various servers that the smart card 101 is aware of and the availability of the more desirable servers.

Step 809: The time agent 401 now uses these four values of time, T1, T2, T3, T4, and the assigned reliability, R1, R2, R3, R4, of their sources to determine an estimated time Te, 811. Various algorithms can be used to computer the estimated time Te. In one embodiment of the invention a simple weighed-average algorithm is used as follows:

$$Te=(T1\times R1+T2\times R2+T3\times R3+T4\times R4)/(R1+R2+R3+R4)$$

A more generalized form of this algorithm can be written as:

$$T_e=(\Sigma T_i R_i)/(\Sigma R_i)$$

Where i is between 1 and N.

Step 813: The time agent 401 uses the assigned reliability, R1, R2, R3, R4, of the time sources to compute reliability index, Ir 815. Various algorithms can be used to compute this reliability index. In one embodiment of the invention the index computation takes into account the reliability of each individual time source as well as the total number of time sources checked. The greater the number of time sources, the greater the reliability index. Similarly, the higher the reliability if these sources, the greater the final reliability index. For the example shown in FIG. 8, the realiabilty index is computed as:

$$Ir=((R1+R2+R3+R4)/4)+(2\times 4)$$

A more general from of this algorithm can written as:

$$I_r=((\Sigma R_i)/N)+2N$$

Where i is between 1 and N

Steps 833 and 835: The estimated time Te, 811, and reliability index Ir, 815, are passed to the policy agent 403 to help conduct time-based transactions, as described herein below in conjunction with FIG. 9. The higher the reliability index, the more reliable the estimated calendar time value.

Policy-Agent 403

In a preferred embodiment, policies for allowing (or rejecting) transactions based on a reliability index of the current calendar time measure of the smart card 101 are enforced by a policy agent 403, illustrated in FIG. 3. The policy agent 403 is a software module having instructions that are executable by the CPU 203. Typically the policy agent 403 would be stored in the NVM 209 and loaded into RAM 207 when executed by the CPU 203. In the embodiment of FIG. 3, application programs 301 call upon the policy agent 403 whenever the application programs 301 wish to perform a time-dependent function, e.g., parsing a digital certificate that has an expiration time.

Figure 9:
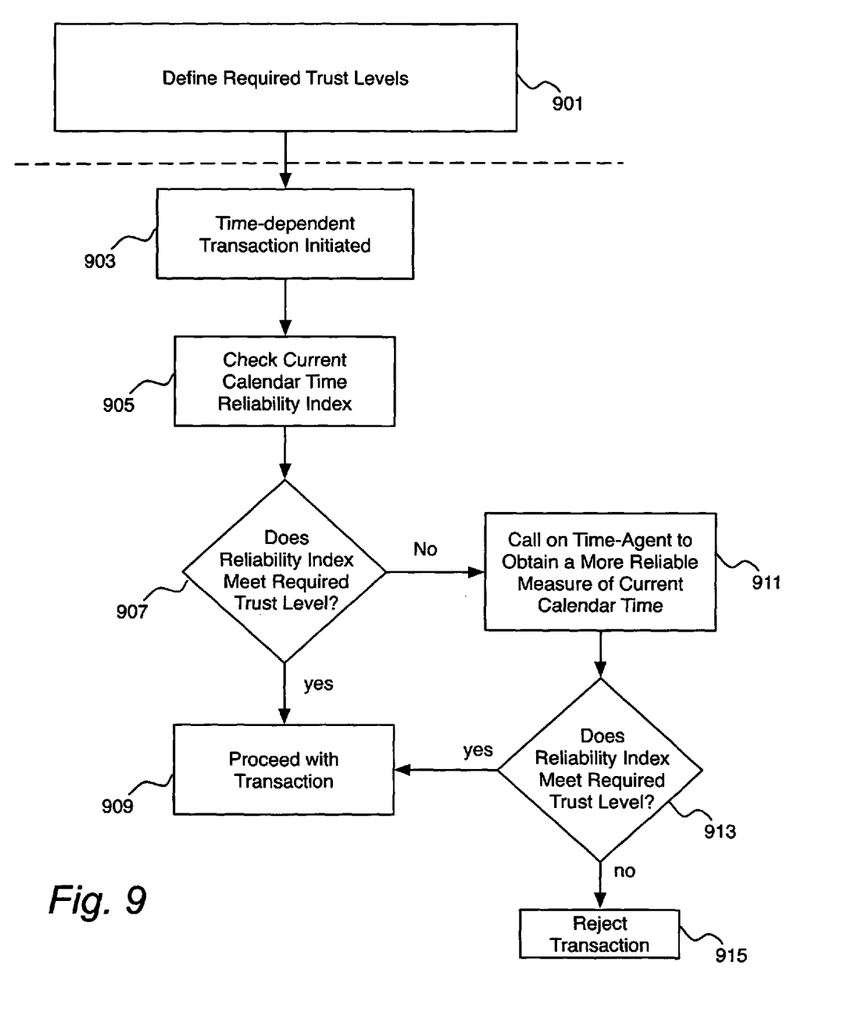
FIG. 9 is a flow-chart illustrating one example of operations of one embodiment of the policy agent according to the invention.

FIG. 9 is a flow-chart illustrating one example of operations of one embodiment of the policy agent 403. As a first step, the various policies relating to the processing of time-dependent transactions are defined, step 901. The policy definition step may be performed at manufacturing of the card 101, e.g., during a personalization step, or, in some deployments, may be set by a user. Since time can be passed to the smart card 101 through a diverse set of methods, as described herein above, each with a varying degree of reliability, the smart card 101 needs to tailor time-based services to reflect the level of trust in the time value that the smart card 101 has in use at the time of any time-dependent transaction. This variation in the type of services offered by the smart card 101 to reflect the degraded time value is called Time Degradation Policy. These policies are specified by the card issuer to suit its needs. In part, they are driven by the risk the card issuer, or card holder, is willing to take while conducting time-critical transactions when the actual time value cannot be acquired from a reliable time source.

When the smart card 101 is initialized during the manufacturing phase, current time is written to the NVM 209 of the smart card 101. This action gives a firm reference for all future time updates—no time value can be less than the initial time recorded at manufacturing. Because smart cards do not have an internal power source, the time value recorded in the NVM 209 becomes stale when the smart card 101 is powered off. When the power is supplied again, the smart card has no idea whether the delta between current calendar time and the last time recorded in NVM 209 is only a few minutes or years. Again, the Time Degradation Policy determines when a new reference time value can be written to the NVM 209 of the card.

Returning now to FIG. 8, in one embodiment of the invention, whenever a time-dependent transaction is performed by an application 301, step 903, the policy agent 403 determines whether the reliability index of the calendar time that the smart card 101 currently meets the requirements of the attempted transaction, step 905.

In one embodiment of the invention, a smart card 101 has three levels of the reliability index associated with the current measure for calendar time maintained by the smart card 101 depending on how the time was originally acquired. In one embodiment of the invention, the time-agent 401 implements the time-acquisition methods described herein above in conjunction with FIGS. 4 through 7. Each such method has associated therewith a reliability level as follows:

Level I: Level I is the highest level of trust in the time value acquired from an external source. The smart card 101 is set to this level when, on power-up, the smart card is able to connect to a dedicated time-server, e.g., using the methods discussed in conjunction with FIGS. 4 and 5. The connection can be over a secure HTTPS link, or an HTTP link with symmetric encryption using shared keys. In either case the smart card 101 places the highest level of trust in the time value obtained from the dedicated server. The new value of the time is written to NVM 209 of the card, and becomes the new reference time. There is no degradation in the level of service provided by the card.

Level II: The card is set to this level when time cannot be acquired from a dedicated time-server; e.g. when the dedicated server is down, or under a denial of service attack. When the dedicated server is under a denial of service attack, it is busy serving fictitious requests from malicious clients and does not have time to respond to the time requests from the smart card 101. The smart card 101 now obtains time from three general-purpose time-servers on the Internet using unencrypted HTTP connection, as discussed in conjunction with FIG. 6, and from the local host device, as discussed in conjunction with FIG. 7. These four values for current calendar time are averaged to obtain a "current" time for use in transactions. Because this calendar time value may not be quite reliable, in one embodiment, it would not be written to the NVM 209 of the smart card 101. In other words, there is no change in the last good reference time maintained by the smart card 101. The smart card 101 now offers a reduced set of services. For example the maximum transaction limit is set to $100.00, and no change in PIN or account settings is allowed. This limit may be further reduced in case it is not possible to acquire time from one of these four time sources.

Level III: The reliability index associated with the current value for calendar time maintained by the smart card 101 is set to level III when it is not possible to get the time from any external source—the dedicated server, the general-purpose servers, or the host device. In this case the smart card 101 only has its own last reference time from its NVM. In such scenarios the card offers only the minimal set of services and that too contingent upon a predefined ceiling. For example, only $50 cumulative transactions can be done at this level. Another option can be to disallow all transactions once a given specified number of consecutive transactions are done at Level III.

If the reliability index associated with the current time satisfies the requirements of the contemplated transaction, step 907, e.g., the reliability index is Level II, and the transaction is below the transaction limit for Level II or the reliability index is Level I in which case all transactions are allowed. If the policy is met for the contemplated transaction, it is allowed to proceed, step 909.

If the policy is not satisfied, i.e., the reliability index associated with the current calendar time maintained by the smart card 101 does not meet the requirements for the transaction, in one embodiment, a new attempt may be made to acquire a more reliable measure of time, step 911. If that attempt does not succeed in obtaining a more reliable time measure, or a time measure with a sufficiently high reliability index, step 913, the transaction is rejected, step 915.

While the discussion above has been focused on the use of a time agent 401 and policy agent 403 for clockless devices that do not have batteries and consequently are not capable of maintaining an internal clock, the use of the time agent 401 and policy agent 403 as described herein may be useful on certain devices that do have batteries and maintain an internal clock. For example, any battery-powered device will eventually lose power if not recharged. Thus, much like a traditional smart card that has a current time stored into NVM at personalization or manufacturing, such devices could have the most recent known good time burned into NVM and when the device realizes that it is powered up from a power failure, the device would use the techniques described herein to obtain a new current time. Furthermore, it is entirely possible that a device with an internal battery would experience some time-drift, especially when not connected to an external power source; i.e., the current time that the device maintains may drift from actual calendar time. If that is a known problem with a particular device, the device could be designed according to the techniques presented herein to recover a new known accurate and reliable time after a period of elapsed time, thereby ensuring that the current time maintained by the device is sufficiently accurate and reliable to proceed with transactions as defined by the policy agent 403. Furthermore, as described herein above, much time may elapse between manufacturing of a clockless device and its deployment. It would not be surprising if the device lost power during that period. Therefore, such a clockless device could use the techniques described herein to obtain an initial value for current time at the time the clockless device is deployed.

Advances in smart card technology have made it possible to treat a smart card as a network peer. Such a smart card can communicate securely with other computers using standard mainstream network communication protocols like TCP/IP and SSL/TLS. Because of this technological advance, smart cards may engage in time sensitive transactions without requiring any smart card specific host software, or modifying the remote servers. However, in order for smart cards to engage in transaction that require a reliable and accurate measure of current calendar time, a reliable external source has to pass a reference time to the smart card. A system and method according to the invention provide a robust mechanism for smart cards to obtain current calendar time from external sources using standard Internet communication protocols and to associate a reliability index with such time values. In another aspect of the invention, a policy agent of a smart card enforces a policy of providing a diverse set of services, depending upon the reliability with which the smart card was able to acquire time thereby allowing or rejecting time-dependent transactions depending on that reliability index.

Because smart cards implementing the invention can acquire current time in a reliable way, Internet time-dependent applications and services can be migrated to such cards thereby increasing the reliability of verifying critical information such as X.509 certificates, XML signatures, etc. Smart cards so enabled can engage in a new range of applications hitherto not suitable for use in conjunction with smart cards, namely, transactions requiring reliable measure of calendar time.

Although specific embodiments of the invention have been described and illustrated, the invention is not to be limited to the specific forms or arrangements of parts so described and illustrated. The invention is limited only by the claims.

The invention claimed is:

1. A method for operating a device, that does not have a local time clock that provides a measure of time on power-up of the device, to enforce a time-based transaction policy that requires a reliable time reference, comprising:
    establishing a communications channel to each of one or more network-attached time sources wherein at least one of the network attached time sources is a dedicated time server deployed to provide time service to a class of devices to which the device that does not have a local time clock that provides a measure of time on power-up of the device belongs;
    using each of the one or more communications channels to inquire from each of the one or more network-attached time-sources as to the current time;
    receiving the current time from each of the one or more network-attached time-sources;
    using the received current times from the one or more network attached time-sources to estimate a current time and to calculate a reliability index for the estimated current time; and
    using the estimated current time and the reliability index associated with the estimated current time to enforce a time-based transaction policy.

2. The method for operating a device, that does not have a local time clock that provides a measure of time on power-up of the device, to enforce a time-based transaction policy that requires a reliable time reference of claim 1, further comprising: correcting each received current time from the one or more network-attached time-sources to adjust for transmission latency between the device that does not have a local time clock that provides an measure of time on power-up of the device and the network-attached time-source.

3. The method for operating a device, that does not have a local time clock that provides a measure of time on power-up of the device, to enforce a time-based transaction policy that requires a reliable time reference of claim 2, wherein each of the received current time from the one or more network attached time-sources is adjusted using a round-trip adjusting formula.

4. The method for operating a device, that does not have a local time clock that provides a measure of time on power-up of the device, to enforce a time-based transaction policy that requires a reliable time reference claim of claim 1, wherein at least one of the network attached time sources is a dedicated time server deployed to provide time service to a class of devices to which the device that does not have a local time clock that provides an measure of time on power-up of the device belongs, wherein the communications channel is a TLS channel established by performing a TLS handshake using a non-expiring certificate.

5. The method for operating a device, that does not have a local time clock that provides a measure of time on power-up of the device, to enforce a time-based transaction policy that requires a reliable time reference of claim 1, wherein each of the one or more communications channels is a secure communications channel established using a pre-negotiated shared secret.

6. The method for operating a device, that does not have a local time clock that provides a measure of time on power-up up the device, to enforce a time-based transaction policy that requires a reliable time reference of claim 5 wherein the shared secret is one or more symmetric keys.

7. The method for operating a device, that does not have a local time clock that provides a measure of time on power-up of the device, to enforce a time-based transaction policy that requires a reliable time reference of claim 5, comprising:
 programming the shared secret into the device during a manufacturing phase.

8. The method for operating a device, that does not have a local time clock that provides a measure of time on power-up of the device, to enforce a time-based transaction policy that requires a reliable time reference of claim 1, wherein at least one of the network attached time sources is a general purpose time server.

9. The method for operating a device, that does not have a local time clock that provides a measure of time on power-up of the device, to enforce a time-based transaction policy that requires a reliable time reference of claim 1, wherein one of the network attached time sources is a host computer to which the device is connected, wherein the method further comprises: operating a web server on the device to receive an initial login request from a web browser operating on the host; in response to the login request from the host, operating the web server to request the web browser to provide a current time over a secure communications channel; receiving from the host the current time; and in response to receiving the current time from the host, transmitting a login page to the host.

10. The method for operating a device, that does not have a local time clock that provides a measure of time on power-up of the device, to enforce a time-based transaction policy that requires a reliable time reference of claim 1, further comprising: comparing the estimated current time to a last reliable time value stored on the device; and rejecting the estimated current time if the estimated current time is earlier than the last reliable time value.

11. A method for operating a device, that does not have a local time clock that provides a measure of time on power-up of the device, to enforce a transaction policy requiring a reliable time reference, comprising:
 establishing a secure communications channel to each of one or more network attached time sources using a procedure selected from the set including: establishing a TLS channel to a dedicated network server having a non-expiring digital certificate, establishing a channel with a dedicated network server using a symmetric key with the dedicated network server, establishing a channel with a general purpose time server for obtaining a value of current time from the general purpose time server, and establishing a channel with a host compute to which the device is connected for obtaining a value of current time from the host computer to which the device is connected, wherein the dedicated network server is deployed to provide time service to a class of devices to which the device that does not have a local time clock that provides a measure of time on power-up of the device belongs;
 obtaining a current time value from each of the one or more network attached time sources;
 assigning a reliability index to the current time value received from each of the one or more time-sources;
 using the received current time value from each of the one or more network attached time sources and the reliability index associated with each received current time value to estimate a current time value and to calculate a reliability index associated with that the estimated current time value; and
 using the estimated current time value and the calculated reliability index to permit or deny permission for certain time sensitive transactions.

12. A method for operating a device that does not have a local time clock that provides a measure of time on power-up to enforce a transaction policy requiring a reliable time reference, comprising:
 establishing a communications channel to each of one or more network attached time sources using a procedure selected from the set including: establishing a TLS channel to a dedicated network server having a non-expiring digital certificate, establishing a channel with a dedicated network server using a symmetric key with the dedicated network server, establishing a channel with at least one general purpose time server for obtaining a value of current time from the at least one general purpose time server, and establishing a channel with a host computer to which the device is connected for obtaining a value of current time from the host computer to which the device is connected, the dedicated network server is deployed to provide time service to a class of devices to which the device that does not have a local time that provides a measure of time on power-up of the device belongs;
 obtaining a current time value from each of the one or more network attached time sources;
 assigning a reliability index to the current time received from each of the one or more time-sources as a function of which procedure was used to obtain the current time from such time source;
 estimating a current time from the obtained current time value from each of the one or more network attached time sources and calculating a reliability index associated with the estimated current time from the reliability index assigned to each of the received current time values; and
 using estimated current time and the calculated reliability index to permit or deny permission for certain time sensitive transactions.

13. A device, that does not have a local time clock that provides a measure of time on power-up of the device, that is capable of enforcing a time-based transaction policy that requires a reliable time reference, comprising:

a central processing unit;
a memory connected to the central processing unit and comprising: a time-agent computer program having instructions to cause the central processing unit to:
  establish a secure communications channel to one or more network-attached time sources;
  inquire each of the one or more network-attached time-sources as to the current time using the communications channel;
  receive the current time from the one or more network-attached time-sources wherein at least one of the one or more network-attached time source is a dedicated time server deployed to provide time service to a class of devices to which the device not capable of independently maintaining a local time clock belongs; and
  estimate the current time from the received current time from each of the one or more network-attached time sources and to calculate a reliability index associated with the estimated current time and a reliability index associated with each of the one or more network-attached time sources; and
a policy-agent computer program having instructions to cause the central processing unit to: use the estimated current time and the calculated reliability index to enforce the time-based transaction policy.

14. The device of claim 13 wherein the time-agent further comprises instructions to cause the CPU to correct the received current time from each one or more network-attached time source to adjust for transmission latency between the operating device and the time-source.

15. The device of claim 14 wherein the time-agent further comprises instructions to cause the CPU to adjust each of the one or more received current times using a round-trip adjusting formula.

16. The device of claim 13 wherein the secure communications channel is a TLS channel and the instructions to establish a secure channel comprise instructions to perform a TLS handshake and wherein the secure channel is established using a non-expiring certificate.

17. The device of claim 13 the secure communications channel is a TLS channel and the instructions to establish a secure channel comprise instructions using a shared secret.

18. The device of claim 17 wherein the shared secret is one or more symmetric keys.

* * * * *